United States Patent [19]

Hamano

[11] Patent Number: 4,832,471

[45] Date of Patent: May 23, 1989

[54] ZOOM LENS

[75] Inventor: Hiroyuki Hamano, Kanagawa, Japan

[73] Assignee: Canon Kabushiki Kaisha, Tokyo, Japan

[21] Appl. No.: 233,486

[22] Filed: Aug. 17, 1988

[30] Foreign Application Priority Data

Aug. 26, 1987 [JP] Japan ................................. 62-211674
Aug. 26, 1987 [JP] Japan ................................. 62-211675

[51] Int. Cl.⁴ ........................................... G02B 15/14
[52] U.S. Cl. ..................................... 350/427; 350/423
[58] Field of Search ................................ 350/423, 427

[56] References Cited

U.S. PATENT DOCUMENTS

| | | | |
|---|---|---|---|
| 4,066,340 | 1/1978 | Besenmatter et al. | 350/427 |
| 4,217,033 | 8/1980 | Göbl | 350/423 |
| 4,621,905 | 11/1986 | Kato et al. | 350/427 |
| 4,699,474 | 10/1987 | Ozawa | 350/427 |
| 4,720,181 | 1/1988 | Hata | 350/427 |
| 4,770,510 | 9/1988 | Mukaiya | 350/427 |

Primary Examiner—John K. Corbin
Assistant Examiner—Scott J. Sugarman
Attorney, Agent, or Firm—Fitzpatrick, Cella, Harper & Scinto

[57] ABSTRACT

A zoom lens including, from front to rear, a first lens unit of positive power for focusing, a second lens unit of negative power having the function of varying the image magnification, a third lens unit of negative power for compensating for the image shift resulting from the variation of the image magnification, a fourth lens unit of positive power receptive of the diverging light bundle from the first lens unit for producing an almost parallel light bundle, and a fifth lens unit having the function of forming an image on the focal plane, wherein the aperture ratio is increased to 1.4 in F-number, the magnification range is extended to about 10, and high grade imaging performance is preserved.

3 Claims, 4 Drawing Sheets

ZOOM LENS

BACKGROUND OF THE INVENTION

1 Field of the Invention

This invention relates to zoom lenses and, more particularly, to zoom lenses of a magnification range of about 10 with a high relative aperture of about 1.4 in F-number, while still maintaining a good optical performance over the entire zooming range. Still more particularly it relates to compact zoom lenses of short total length suited to photographic cameras or video cameras.

2. Description of the Related Art

To the photographic cameras, video cameras, etc., there is a growing demand for zoom lenses of increased relative aperture and extended range while nevertheless maintaining high optical performance.

Of these, the zoom lens for video camera for home use is required to have as high a resolving power as, for example, 50 lines/mm in spatial frequency over the entire area of the picture frame, as the density of picture elements in the CCD or like image pickup element increases and the recording method such as the S-VHS is improved.

Besides this requirement, for the general-purpose video camera, because its image pickup element is relatively low in sensitivity, the zoom lens is required to have as large an aperture ratio as possible.

A zoom lens of which the F-number is about 1.4, and the range is about 10 is proposed in, for example, Japanese Laid-Open Patent Applications Nos. Sho 54-17042 and 54-23556. This zoom lens comprises, from front to rear, a first lens unit of positive power for focusing, a second lens unit of negative power for variation of the image magnification, a third lens unit for compensating for the image shift resulting from the variation of the image magnification, a fourth lens unit for making the light bundle from the third lens unit an afocal light bundle, and a fifth lens unit for image formation. Hence, the above-cited documents propose the so-called 5-unit zoom lens.

With the use of the 5-unit type in the zoom lens design, to achieve great increases in the aperture ratio and the zoom ratio at once, it is effective in the general case to weaken the refractive power of each lens unit. Weakening of the refractive power, however, causes the total length of the lens system and the lens diameter to increase, which is scarcely favor to the video camera for home use, since its requirement for compact form is rigorous.

Also, if the F-number at full open aperture is made larger, it becomes easier to reduce the bulk of the lens diameter. But, for the video camera employing the low-sensitive image pickup element, the larger values of the F-number are of little use.

In general, to achieve a good compromise between the requirements of decreasing the F-number and of reducing the bulk and size of entirety of the lens system of increased zoom ratio, it becomes of great importance that the various design parameters for all the lens units constituting the lens system are set at appropriate values.

If merely relied on the method of strengthening the refractive power of each individual lens unit, the compact form and the increase of the aperture ratio of the lens system would result in production of large spherical aberration in the paraxial region of the picture format and large higher order aberrations such as coma and sagittal halo in the marginal zone, which can hardly be corrected for high grade imaging performance.

For example, the configuration of the lens system to the compact form by strengthening the refractive power of the front or first lens unit leads to the necessity of increasing the overall image magnifying power of the variator through the image forming unit. As a result, the first lens unit produces many aberrations which are difficult to correct by the suitable design of the following lens units. The manufacturing tolerances also become severer.

Also, the zoom section of the second and third lens units, when both of their refractive powers are strengthened to increase the magnification range, gives rise to a large range of variation with zooming of all aberrations, particularly meridional curvature of field and lateral chromatic aberration. And the difficulty of maintaining good correction of these aberrations stable throughout is increased.

Meanwhile, zoom lenses suited to video cameras are known in U.S. Pat. Nos. 4,518,228, 4,525,036, 4,618,219, 4,621,905, 4,653,874 and 4,659,187. In addition, there are Japanese Laid-Open Patent Applications Nos. Sho 59-222807, 60-260912 and 61-20291 and U.S. patent application Ser. No. 190,472 filed May 5, 1988.

SUMMARY OF THE INVENTION

A first object of the present invention is to provide a zoom lens of increased relative aperture while still permitting a great increase of the magnification range to be achieved.

A second object is to provide a compact zoom lens.

A third object is to provide a zoom lens which, while achieving the above-described first and second objects, enables good stability of high grade imagery to be maintained throughout the extended zooming range.

BRIEF DESCRIPTION OF THE DRAWINGS

FIGS. 2(A), 2(B), 2(C) to FIGS. 4(A), 4(B), 4(C) are graphic representations of the aberrations of numerical examples 1 to 3 of the invention respectively. In those figures, FIGS. 2(A), 3(A), 4(A) are the aberration curves in the wide angle end; FIGS. 2(B), 3(B), 4(B) in the middle position; FIGS. 2(C), 3(C), 4(C) in the telephoto end.

Figure 1:
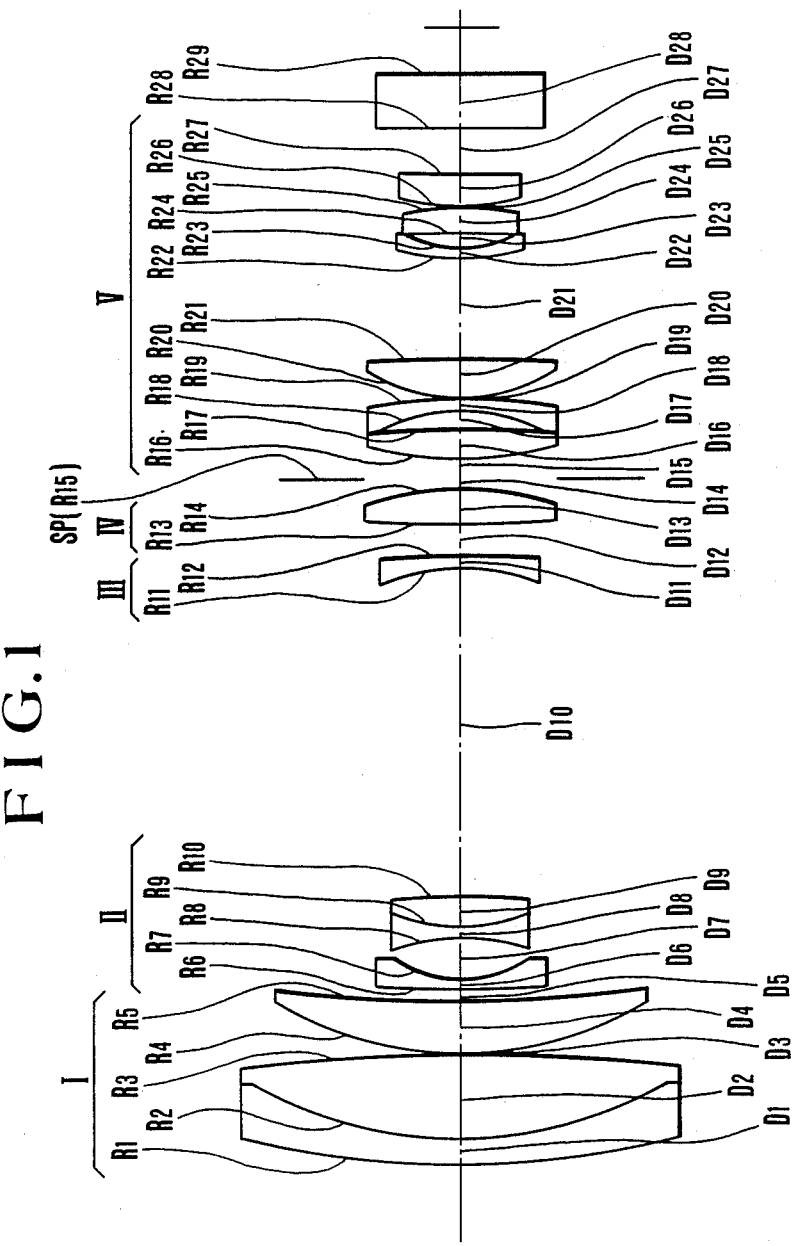
FIG. 1 is a longitudinal section view of a numerical example 1 of a zoom lens of the invention.
Figure 2A:
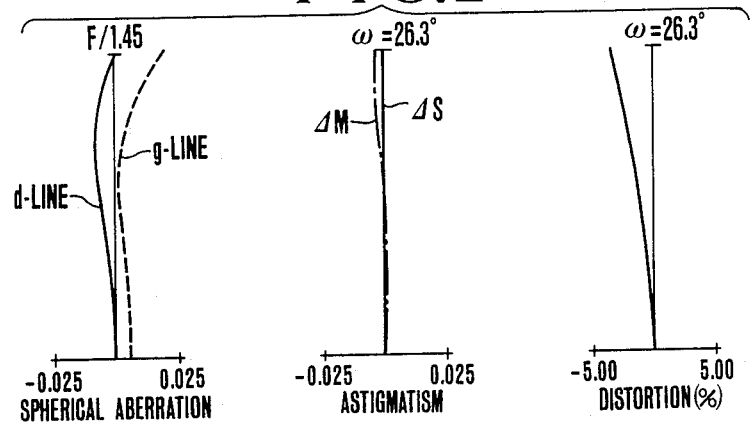
Figure 2B:
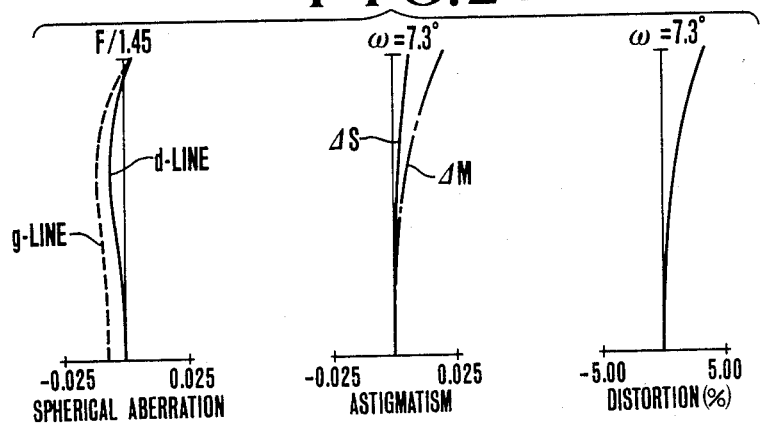
Figure 2C:
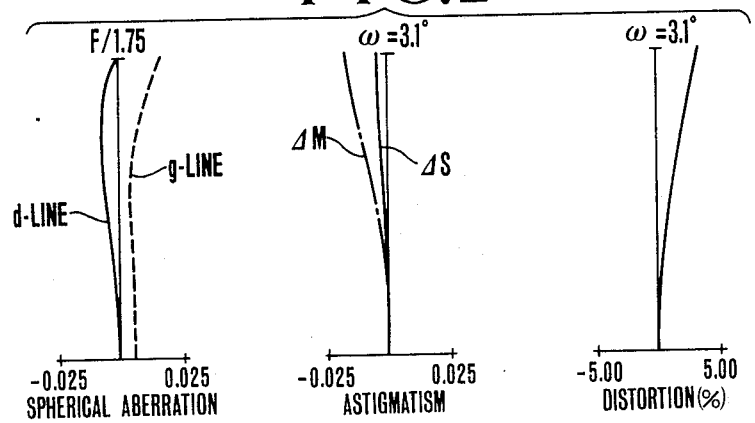
Figure 3A:
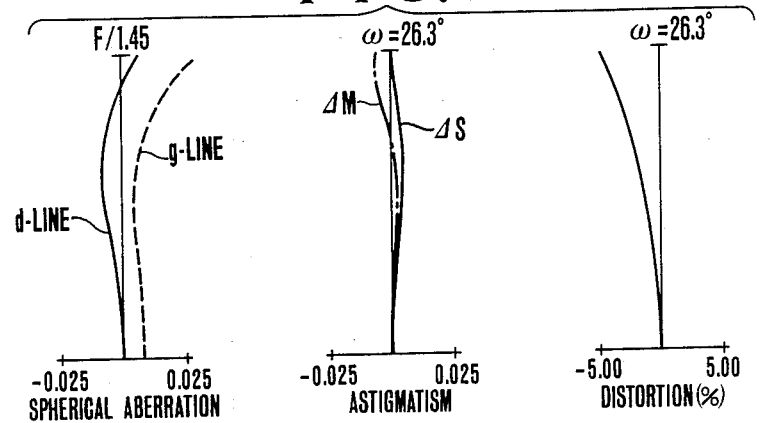
Figure 3B:
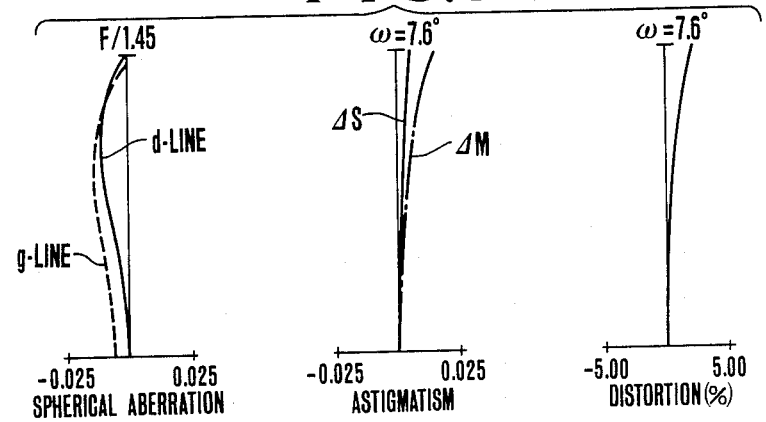
Figure 3C:
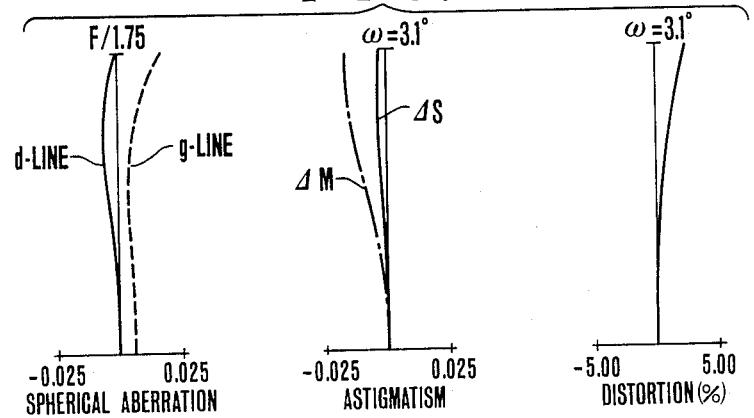
Figure 4A:
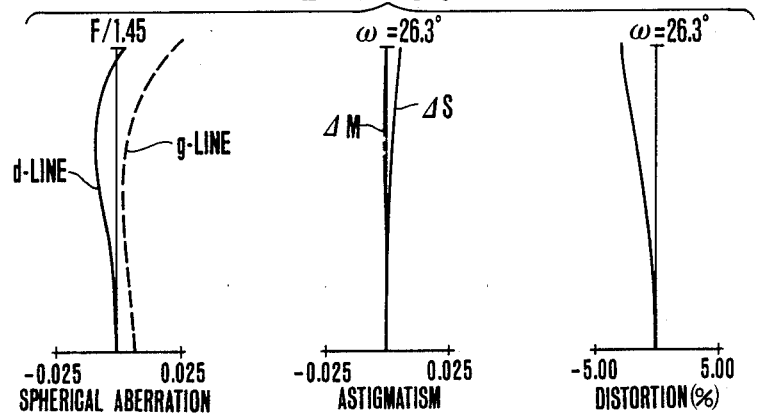
Figure 4B:
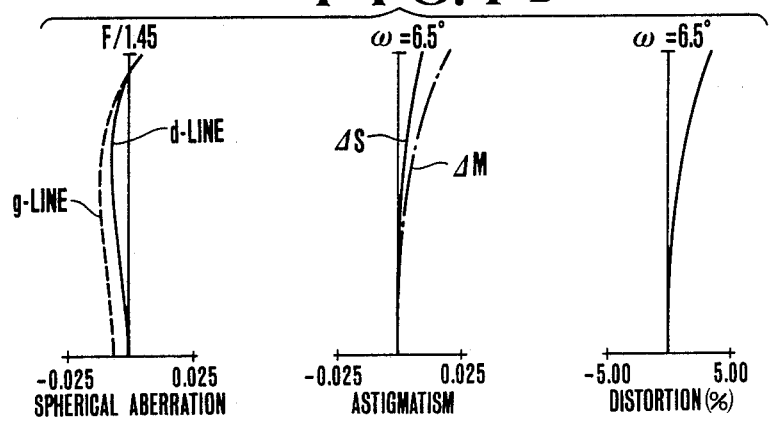
Figure 4C:
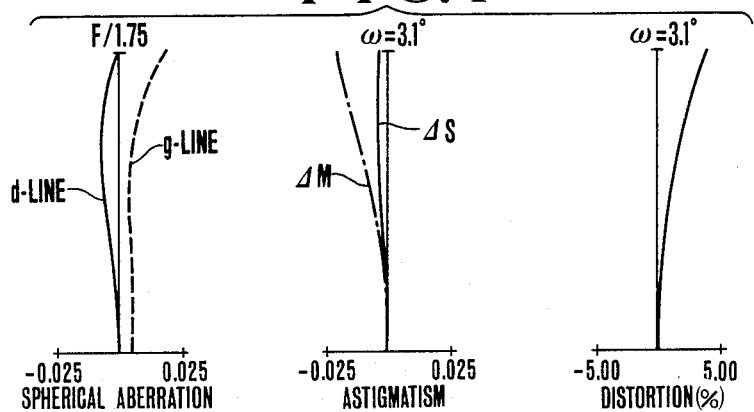

In the drawings, I, II, III, IV and V are respectively the first, second, third, fourth and fifth lens units. $\Delta M$ is the meridional image surface, and AS is the sagittal image surface. d is the d-line, and g is the g-line. SP is a stop.

DETAILED DESCRIPTION OF THE PREFERRED EMBODIMENTS

In FIG. 1 there is shown an embodiment of the invention. The zoom lens comprises, from front to rear, a first lens unit I of positive power for focusing, a second lens unit II of negative refractive power for varying the image magnification, a third lens unit III of negative refractive power for compensating for the image shift resulting from the variation of the image magnification, a fourth lens unit IV of positive refractive power receptive of a diverging light bundle from the third lens unit III for producing an almost parallel light bundle, an axially stationary stop SP and a fixed fifth lens unit V having the image forming function. The second lens unit II comprises, from front to rear, a negative meniscus-shaped first lens having a convex surface facing the object side, a second lens of which both lens surfaces are concave, and a positive third lens, the second and third lenses being cemented together. The third lens unit III comprises a negative meniscus-shaped singlet lens having a convex surface facing the image plane side. Letting the radius of curvature of the j-the lens surface of the i-the lens unit be denoted by Ri,j, the refractive index and Abbe number of the glass of the j-the lens of the i-the lens unit by Ni,j and νi,j respectively, the focal length of the i-th lens unit by Fi, the longest focal length of the entire lens system by FT, the image magnifications of the second and third lens units II and III in the telephoto end by β2T and β3T respectively, and the zoom ratio by Z, the following conditions are satisfied:

$$0.15 < |F2/FT| < 0.19 \quad (1)$$

$$1.05 < |\beta 2T/\sqrt{Z}| < 1.25 \quad (2)$$

$$0.1 < |\beta 3T/\sqrt{Z}| < 0.15 \quad (3)$$

$$1.73 < (N2,1+N2,2)/2 \quad (4)$$

$$20 < (\nu 2,1+\nu 2,2)/2 - \nu 2,3 \quad (5)$$

$$0.53 < |R3,1/F3| < 0.65 \quad (6)$$

The technical significance of each of the above-defined conditions is explained below.

The inequalities of condition (1) concerning the negative refractive power of the second lens unit II are set forth for easily obtaining the desired zoom ratio while minimizing the variation of aberrations with zooming. When the refractive power becomes too strong as exceeding the lower limit, a large increase of the variation with zooming of aberrations results, which is difficult to correct, although the total zooming movement of the second lens unit II gets shorter. When the refractive power becomes too weak as exceeding the upper limit, the required total movement of the second lens unit II for obtaining the predetermined zoom ratio is increased to increase the total length of the entire lens system objectionably.

The inequalities of conditions (2) and (3) concerning the ratios of the image magnifications of the second and third lens units II and III in the telephoto end to the zoom ratio, are set forth for a main aim of minimizing the bulk and size of the entire lens system, while keeping the predetermined zoom ratio.

When the image magnification of the second lens unit II becomes too low as exceeding the lower limit of the inequalities of condition (2), the separation between the second and third lens units II and III at the wide angle end is so expanded that the diameter of the first lens unit I is increased largely. Otherwise, a predetermined level of illumination in the corners of the picture format would become difficult to secure. When the image magnification of the second lens unit II becomes too high as exceeding the upper limit, the separation between the second and third lens units II and III at the telephoto end must be set so elongated in order to avoid mechanical interference between them when zooming. This results in an objectionably large increase of the total length of the entire lens system.

When the image magnification of the third lens unit III becomes too low as exceeding the lower limit of the inequalities of condition (3), the refractive power of the third lens unit III gets stronger in the negative sense. This results in too much an increase of the angle of divergence of the light bundle from the third lens unit III, and calls for an increase of the diameter for the outer marginal rays of the fourth lens unit IV. Conversely when the image magnification of the third lens unit III becomes too high as exceeding the upper limit, the negative refractive power of the third lens unit III gets weaker which in turn causes the total zooming movement of the third lens unit III to increase. Along with this, the total length of the entire lens system is caused to increase.

The inequalities of conditions (4) and (5) concerning the refractive indices and Abbe numbers of the glasses of the three lenses constituting the second lens unit II are set forth for a main aim of minimizing the variation with zooming of the various aberrations, for example, chromatic aberrations.

When the refractive indices of the glasses of the first and second lenses in the second lens unit II become too small as falling outside the inequality of condition (4), the variation with zooming of the aberrations, particularly the meridional field curvature, gets larger, which is difficult to correct well.

Also, when the inequality of condition (5) is violated, the variation with zooming of chromatic aberrations particularly in the marginal zone gets larger, increasing the difficulty of preserving good imagery over the entire area of the picture format.

The inequalities of condition (6) concerning the third lens unit III constructed in the form of a singlet lens and the configuration of that singlet are set forth for a main aim of minimizing the spherical aberration in the wide angle end. When either of the upper and lower limits is exceeded, it gets harder to well correct the spherical aberration at or near the wide angle end.

The objects of the invention are accomplished when all the above-defined conditions are satisfied. Yet, to achieve a minimization of the range of variation with focusing of aberrations for high standard of optical performance, the invention sets forth the following features:

The above-identified first lens unit I includes, from front to rear, a negative meniscus-shaped first lens having a convex surface facing the object side, a second lens of which both surfaces are convex, and a positive meniscus-shaped third lens having a convex surface facing the object side. The first lens and the second lens are cemented together at their adjoining surfaces, and the following condition is satisfied:

$$1.85 < (R1,5+R1,4)/(R1,5-R1,4) < 2.05 \quad (7)$$

The inequalities of condition (7) concern with the configuration of the third lens in the first lens unit I and have a main aim of correcting the curvature of field and the astigmatism in good balance in the wide angle end. When the lower limit is exceeded, the astigmatism in the telephoto end is increased largely, which becomes difficult to correct. When the upper limit is exceeded, the meridional curvature of field in the telephoto end is increased in the positive direction objectionably.

It should be noted that in the invention to achieve a further improvement of the aberration correction, the fourth lens unit IV and the fifth lens unit V are preferably constructed as follows:

The fourth lens unit IV has a first lens having a strong refracting surface facing the image plane side. The fifth lens unit V includes six lenses, i.e., from front to rear, a bi-convex first lens having a strong refracting surface facing the object side, a negative meniscus-shaped second lens having a concave surface facing the object side, a positive third lens having a strong refracting surface facing the object side, a negative meniscus-shaped fourth lens having a convex surface facing the object side, a positive fifth lens and a positive sixth lens having a strong refracting surface facing the object side.

Next, with respect to the fifth lens unit V that fulfills the image forming function, additional features of the invention are described. For the zoom lens having five lens units, of which the first lens unit I, counting from front, is of positive refractive power for focusing, the second lens unit II is of negative refractive power having the function of varying the image magnification, the third lens unit III is of negative refractive power for compensating for the image shift resulting from the variation of the image magnification, the fourth lens unit IV is of positive refractive power for making a diverging light bundle from the third lens unit III to become an almost parallel light bundle, and the fifth lens unit V has the function of forming an image on a focal plane. The fourth lens unit IV has a bi-convex first lens, counting from front, having a strong refracting surface facing the image plane side, and the fifth lens unit V includes six lenses of which the first, counting from front, is a bi-convex lens having a strong refracting surface facing the object side, the second is a negative meniscus-shaped lens having a concave surface facing the object side, the third is a positive lens having a strong refracting surface facing the object side, the fourth is a negative meniscus-shaped lens having a convex surface facing the object side, the fifth is a positive lens and the sixth is a positive lens having a strong refracting surface facing the object side. Letting the radius of curvature of the j-the lens surface in the i-the lens unit be denoted by $Ri,j$, the axial lens thickness or air separation by $Di,j$, the focal length of the i-the lens unit by $Fi$, and the longest focal length of the entire lens system by $FT$, the following conditions are satisfied:

$$1.8 < F1/F4 < 2.2 \quad (8)$$

$$0.34 < F4/FT < 0.42 \quad (9)$$

$$0.27 < D5,6/F5 < 0.38 \quad (10)$$

$$2.8 < (R5,7 + R5,8)/(R5,7 - R5,8) < 3.8 \quad (11)$$

$$0.82 < |R4,2/F4| < 0.90 \quad (12)$$

Accordingly, the aperture ratio and the magnification range are greatly increased in such a manner that all aberrations are well corrected for high grade imaging performance over the entire zooming range.

Particularly the residual aberrations of the zoom section, for example, the spherical and comatic ones, are corrected in good balance, while maintaining the minimization of the total length of the entire lens system to be achieved.

The technical significance of each of the above-defined conditions is explained below.

The inequalities of condition (8) concern with the ratio of the refractive power of the first lens unit I for focusing to the refractive power of the afocal or fourth lens unit IV, and the inequalities of condition (9) concern with the ratio of the refractive power of the fourth lens unit IV to the refractive power of the entire lens system in the telephoto end. When the refractive power of the fourth lens unit IV becomes too weak as exceeding the lower limit of condition (8), it gets harder to make afocal the light bundle emerging from the fourth lens unit IV. For this reason, the refractive power of the third lens unit III must be decreased. Hence, the required total zooming movement of the third lens unit III for securing the predetermined zoom ratio is increased, causing the total length of the entire lens system and the diameter of the zoom section to increase objectionably.

When the refractive power of the first lens unit I becomes too weak as exceeding the upper limit, the first lens unit I must be arranged nearer to the object side in order to preserve the proper relationship between the image magnifying powers of the first lens unit I and the zoom section comprised of the second and third lens units II and III. This results in an objectionably large increase of the diameter of the first lens unit I.

When the refractive power of the fourth lens unit IV becomes too strong as exceeding the lower limit of the condition (9), large higher-order spherical aberration, coma and other many aberrations are produced, which are difficult to correct well. Conversely when the refractive power of the fourth lens unit IV becomes too weak as exceeding the upper limit, it gets harder to make afocal the diverging light bundle from the third lens unit III. Thus, it becomes difficult to find out adequate rules of design for the construction and arrangement of the elements of the zoom section. Moreover, the diameter of the fifth lens unit V is caused to increase so that objectionably large spherical aberration and coma are produced.

The inequalities of condition (10) concern with the air separation between the third and fourth lenses in the fifth lens unit V. When the separation becomes too short as exceeding the lower limit, the height of incidence of the on-axis ray on the fourth lens gets higher, causing its diameter to increase and large spherical aberration, coma, etc. to be produced from the fourth lens and those that follow. These aberrations become difficult to correct well.

When the separation becomes too long as exceeding the upper limit, the total length of the entire lens system is caused to increase, and it gets harder to obtain a prescribed value of the back focal distance.

The inequalities of condition (11) concerning the configuration of the fourth lens in the fifth lens unit V have an aim of well correcting particularly astigmatism and curvature of field. When the lower limit is exceeded, it becomes difficult to correct the positive astigmatism the zoom section produces in the zooming region from the wide angle end to the middle position. When the upper limit is exceeded, the negative astigmatism the zoom section produces at or near the telephoto end becomes difficult to correct.

The inequalities of condition (12) concerning the fourth lens unit IV constructed in the form of a singlet and the configuration of that singlet have an aim of well correcting various aberrations, particularly spherical one. When the lower limit is exceeded, under-correction of negative spherical aberration results. Conversely when the upper limit is exceeded, over-correction of spherical aberration results.

Incidentally, the term "strong refracting surface facing the image plane side" used in the above means that it is compared with the refracting power of the other surface, that is, that surface which faces the object side. The same applies to the term "strong refracting surface facing the object side". By setting forth such rules of design for the fourth and fifth lens units, the residual aberrations of the zoom section, for example, the spherical one and, in the marginal zone, the inward comatic one, can be corrected in good balance over the entire area of the picture format.

Three examples of specific zoom lenses of the invention can be constructed in accordance with the numerical data given in the following tables for the radii of curvature, R, the axial thicknesses or air separations, D, and the refractive indices, N, and Abbe numbers, $\nu$, of the glasses of the lenses with the subscripts numbered consecutively from front to rear. R28 and R29 define a face plate, a filter or like glass block.

The values of the factors in the above-cited conditions for these numerical examples are also listed in Table-1.

| Numerical Example 1 |
|---|
| F = 1-9.213  FNo = 1:1.45-1.75  2ω = 52.6°-6.2° |

| | | | |
|---|---|---|---|
| R1 = 13.021 | D1 = 0.313 | N1 = 1.80518 | $\nu$1 = 25.4 |
| R2 = 5.457 | D2 = 1.120 | N2 = 1.61272 | $\nu$2 = 58.7 |
| R3 = −20.596 | D3 = 0.018 | | |
| R4 = 4.943 | D4 = 0.602 | N3 = 1.62299 | $\nu$3 = 58.2 |
| R5 = 15.454 | D5 = Variable | | |
| R6 = 15.154 | D6 = 0.144 | N4 = 1.83400 | $\nu$4 = 37.2 |
| R7 = 1.749 | D7 = 0.546 | | |
| R8 = −2.135 | D8 = 0.120 | N5 = 1.71300 | $\nu$5 = 53.8 |
| R9 = 2.132 | D9 = 0.421 | N6 = 1.84666 | $\nu$6 = 23.9 |
| R10 = −7.257 | D10 = Variable | | |
| R11 = −2.891 | D11 = 0.120 | N7 = 1.69680 | $\nu$7 = 55.5 |
| R12 = −15.903 | D12 = Variable | | |
| R13 = 12.765 | D13 = 0.469 | N8 = 1.71300 | $\nu$8 = 53.8 |
| R14 = −3.261 | D14 = 0.156 | | |
| R15 = Stop | D15 = 0.241 | | |
| R16 = 4.581 | D16 = 0.385 | N9 = 1.62299 | $\nu$9 = 58.2 |
| R17 = −19.984 | D17 = 0.222 | | |
| R18 = −3.002 | D18 = 0.144 | N10 = 1.84666 | $\nu$10 = 23.9 |
| R19 = −8.657 | D19 = 0.018 | | |
| R20 = 2.768 | D20 = 0.481 | N11 = 1.62299 | $\nu$11 = 58.2 |
| R21 = 114.872 | D21 = 1.311 | | |
| R22 = 2.841 | D22 = 0.120 | N12 = 1.80518 | $\nu$12 = 25.4 |
| R23 = 1.416 | D23 = 0.225 | | |
| R24 = 95.810 | D24 = 0.301 | N13 = 1.51633 | $\nu$13 = 64.1 |
| R25 = −5.706 | D25 = 0.018 | | |
| R26 = 1.909 | D26 = 0.433 | N14 = 1.62299 | $\nu$14 = 58.2 |
| R27 = ∞ | D27 = 0.602 | | |
| R28 = ∞ | D28 = 0.722 | N15 = 1.51633 | $\nu$15 = 64.1 |
| R29 = ∞ | | | |

| Focal Length | W | M | T |
|---|---|---|---|
| D5 | 0.1491 | 3.1611 | 4.1677 |
| D10 | 4.2806 | 0.7504 | 0.4488 |
| D12 | 0.4146 | 0.9328 | 0.2277 |

| Numerical Example 2 |
|---|
| F = 1-9.190  FNo = 1:1.45-1.75  2ω = 52.6°-6.2° |

| | | | |
|---|---|---|---|
| R1 = 13.148 | D1 = 0.313 | N1 = 1.80518 | $\nu$1 = 25.4 |
| R2 = 5.556 | D2 = 1.096 | N2 = 1.61272 | $\nu$2 = 58.7 |
| R3 = −24.095 | D3 = 0.018 | | |
| R4 = 4.868 | D4 = 0.602 | N3 = 1.62299 | $\nu$3 = 58.2 |
| R5 = 15.485 | D5 = Variable | | |
| R6 = 11.836 | D6 = 0.144 | N4 = 1.83400 | $\nu$4 = 37.2 |
| R7 = 1.653 | D7 = 0.546 | | |
| R8 = −2.032 | D8 = 0.120 | N5 = 1.69680 | $\nu$5 = 55.5 |

-continued

| Numerical Example 2 |
|---|

| | | | |
|---|---|---|---|
| R9 = 2.304 | D9 = 0.421 | D6 = 1.84666 | $\nu$6 = 23.9 |
| R10 = −9.521 | D10 = Variable | | |
| R11 = −2.427 | D11 = 0.120 | N7 = 1.69680 | $\nu$7 = 55.5 |
| R12 = −20.226 | D12 = Variable | | |
| R13 = 11.427 | D13 = 0.469 | N8 = 1.71300 | $\nu$8 = 53.8 |
| R14 = −2.901 | D14 = 0.156 | | |
| R15 = Stop | D15 = 0.241 | | |
| R16 = 3.896 | D16 = 0.385 | N9 = 1.62299 | $\nu$9 = 58.2 |
| R17 = −44.828 | D17 = 0.224 | | |
| R18 = −2.970 | D18 = 0.144 | N10 = 1.84666 | $\nu$10 = 23.9 |
| R19 = −9.801 | D19 = 0.018 | | |
| R20 = 2.348 | D20 = 0.481 | N11 = 1.63854 | $\nu$11 = 55.4 |
| R21 = 7.946 | D21 = 1.055 | | |
| R22 = 2.425 | D22 = 0.120 | N12 = 1.80518 | $\nu$12 = 25.4 |
| R23 = 1.398 | D23 = 0.246 | | |
| R24 = 7.955 | D24 = 0.253 | N13 = 1.51633 | $\nu$13 = 64.1 |
| R25 = −22.510 | D25 = 0.018 | | |
| R26 = 2.201 | D26 = 0.385 | N14 = 1.63854 | $\nu$14 = 55.4 |
| R27 = ∞ | D27 = 0.602 | | |
| R28 = ∞ | D28 = 0.722 | N15 = 1.51633 | $\nu$15 = 64.1 |
| R29 = ∞ | | | |

| Focal Length | W | M | T |
|---|---|---|---|
| D5 | 0.1602 | 3.1722 | 4.2615 |
| D10 | 4.4474 | 1.0659 | 0.4241 |
| D12 | 0.4202 | 0.7896 | 0.3422 |

| Numerical Example 3 |
|---|
| F = 1-9.190  FNo = 1:1.45-1.75  2ω = 52.6°-6.2° |

| | | | |
|---|---|---|---|
| R1 = 12.993 | D1 = 0.313 | N1 = 1.80518 | $\nu$1 = 25.4 |
| R2 = 5.223 | D2 = 1.084 | N2 = 1.62299 | $\nu$2 = 58.2 |
| R3 = −19.681 | D3 = 0.018 | | |
| R4 = 4.623 | D4 = 0.602 | N3 = 1.62280 | $\nu$3 = 57.0 |
| R5 = 14.249 | D5 = Variable | | |
| R6 = 19.182 | D6 = 0.144 | N4 = 1.83400 | $\nu$4 = 37.2 |
| R7 = 1.643 | D7 = 0.506 | | |
| R8 = −1.976 | D8 = 0.120 | N5 = 1.71300 | $\nu$5 = 53.8 |
| R9 = 2.047 | D9 = 0.421 | N6 = 1.84666 | $\nu$6 = 23.9 |
| R10 = −9.653 | D10 = Variable | | |
| R11 = −2.835 | D11 = 0.120 | N7 = 1.69680 | $\nu$7 = 55.5 |
| R12 = −16.268 | D12 = Variable | | |
| R13 = 15.633 | D13 = 0.469 | N8 = 1.71300 | $\nu$8 = 53.8 |
| R14 = −3.071 | D14 = 0.156 | | |
| R15 = Stop | D15 = 0.241 | | |
| R16 = 4.400 | D16 = 0.385 | N9 = 1.62299 | $\nu$9 = 58.2 |
| R17 = −13.914 | D17 = 0.222 | | |
| R18 = −2.994 | D18 = 0.144 | N10 = 1.84666 | $\nu$10 = 23.9 |
| R19 = −9.877 | D19 = 0.018 | | |
| R20 = 2.784 | D20 = 0.481 | N11 = 1.62299 | $\nu$11 = 58.2 |
| R21 = −140.998 | D21 = 1.264 | | |
| R22 = 2.793 | D22 = 0.120 | N12 = 1.80518 | $\nu$12 = 25.4 |
| R23 = 1.420 | D23 = 0.225 | | |
| R24 = −40.349 | D24 = 0.301 | N13 = 1.51633 | $\nu$13 = 64.1 |
| R25 = −4.754 | D25 = 0.018 | | |
| R26 = 2.198 | D26 = 0.433 | N14 = 1.63854 | $\nu$14 = 55.4 |
| R27 = ∞ | D27 = 0.602 | | |
| R28 = ∞ | D28 = 0.722 | N15 = 1.51633 | $\nu$15 = 64.1 |
| R29 = ∞ | | | |

| Focal Length | W | M | T |
|---|---|---|---|
| D5 | 0.1807 | 3.1928 | 3.9545 |
| D10 | 4.1231 | 0.6097 | 0.4630 |
| D12 | 0.4049 | 0.9063 | 0.2912 |

TABLE 1

| | | Numerical Examples | | |
|---|---|---|---|---|
| | Conditions | 1 | 2 | 3 |
| (1) | $|F2/FT|$ | 0.170 | 0.170 | 0.157 |
| (2) | $|\beta2T/\sqrt{Z}|$ | 1.169 | 1.100 | 1.102 |

TABLE 1-continued

| | Conditions | Numerical Examples | | |
|---|---|---|---|---|
| | | 1 | 2 | 3 |
| (3) | $\|\beta 3T/\sqrt{Z}\|$ | 0.126 | 0.110 | 0.132 |
| (4) | $(N2,1 + N2,2)/2$ | 1.774 | 1.765 | 1.774 |
| (5) | $\frac{(\nu 2,1 + \nu 2,2)}{2} - \nu 2,3$ | 21.6 | 22.5 | 21.6 |
| (6) | $\|R3,1/F3\|$ | 0.568 | 0.612 | 0.573 |
| (7) | $\frac{(R1,5 + R1,4)}{(R1,5 - R1,4)}$ | 1.941 | 1.917 | 1.960 |
| (8) | F1/F4 | 1.915 | 2.180 | 1.838 |
| (9) | F4/FT | 0.4003 | 0.3580 | 0.3959 |
| (10) | D5,6/F5 | 0.3688 | 0.2785 | 0.3459 |
| (11) | $\frac{(R5,7 + R5,8)}{(R5,7 - R5,8)}$ | 2.988 | 3.720 | 3.070 |
| (12) | $\|R4,2/F4\|$ | 0.8842 | 0.8818 | 0.8442 |

It will be appreciated from the foregoing that the present invention is able to realize a zoom lens of which the aperture ratio and the magnification range are greatly increased at once, while still permitting the bulk and size of the entire lens system to be minimized in such a manner that the imaging performance remains high grade, thus being suited to the photographic camera or video camera.

What is claimed is:

1. A zoom lens comprising, from front to rear, a first lens unit of positive refractive power for focusing, a second lens unit of negative refractive power having the function of varying the image magnification, a third lens unit of negative refractive power for compensating for the image shift resulting from the variation of the image magnification, a fourth lens unit for making the diverging light bundle from said third lens unit an almost parallel light bundle, and a fifth lens unit having the function of forming an image, said second lens unit including, from front to rear, a negative meniscus-shaped first lens having a convex surface facing the object side, a second lens of which both surfaces are concave, and a positive third lens, said second and said third lenses being cemented together, said third lens unit consisting of a negative meniscus-shaped singlet lens having a convex surface facing the image plane side, and said zoom lens satisfying the following conditions:

$$0.15 < |F2/FT| < 0.19$$

$$1.05 < |\beta 2T/\sqrt{Z}| < 1.25$$

$$0.1 < |\beta 3T/\sqrt{Z}| < 0.15$$

$$1.73 < (N2,1 + N2,2)/2$$

$$20 < (\nu 2,1 + \nu 2,2)/2 - \nu 2,3$$

$$0.53 < |R3,1/F3| < 0.65$$

where $Ri,j$ is the radius of curvature of the j-the lens surface in the i-the lens unit, $Ni,j$ and $\nu i,j$ are respectively the refractive index and Abbe number of the glass of the j-the lens in the i-the lens unit, $Fi$ is the focal length of the i-the lens unit, $FT$ is the longest focal length of the entire lens system, $\beta 2T$ and $\beta 3T$ are respectively the image magnifications of said second and third lens units in the telephoto end, and $Z$ is the zoom ratio.

2. A zoom lens according to claim 1, wherein said first lens unit includes, from front to rear, a negative meniscus-shaped first lens having a convex surface facing the object side, a second lens of which both surfaces are convex, and a positive meniscus-shaped third lens having a convex surface facing the object side, said first and said second lenses of said first lens unit being cemented together, and satisfying the following condition:

$$1.85 < (R1,5 + R1,4)/(R1,5 - R1,4)\; 2.05$$

3. A zoom lens comprising, from front to rear, a first lens unit of positive refractive power for focusing, a second lens unit of negative refractive power having the function of varying the image magnification, a third lens unit of negative refractive power for compensating for the image shift resulting from the variation of the image magnification, a fourth lens unit for making the diverging light bundle from the third lens unit an almost parallel light bundle, and a fifth lens unit having the function of forming an image, said fourth lens unit having a lens of which both lens surfaces are convex and which has a strong refracting surface facing the object side, said fifth lens unit including, from front to rear, a first lens of which both surfaces are convex and which has a strong refracting surface facing the object side, a negative meniscus-shaped second lens having a concave surface facing the object side, a positive third lens having a strong refracting surface facing the object side, a negative meniscus-shaped fourth lens having a convex surface facing the object side, a positive fifth lens and a positive sixth lens having a strong refracting surface facing the object side, said zoom lens satisfying the following conditions:

$$1.8 < F1/F4 < 2.2$$

$$0.34 < F4/FT < 0.42$$

$$0.27 < D5,6/F5 < 0.38$$

$$2.8 < (R5,7 + R5,8)/(R5,7 - R5,8) < 3.8$$

$$0.82 < |R4,2/F4| < 0.90$$

where $Ri,j$ is the radius of curvature of the j-the lens surface, counting from front, in the i-the lens unit, $Di,j$ is the lens thickness or air separation, $Fi$ is the focal length of the i-the lens unit, and $FT$ is the longest focal length of the entire lens system.

* * * * *

UNITED STATES PATENT AND TRADEMARK OFFICE
CERTIFICATE OF CORRECTION

PATENT NO. : 4,832,471
DATED : May 23, 1989
INVENTOR(S) : HIROYUKI HAMANO

It is certified that error appears in the above-identified patent and that said Letters Patent is hereby corrected as shown below:

At column 3, line 9, "j-the lens" should read --j-th lens--;

At column 3, line 10, "i-the lens" should read --i-th lens--; and

At column 3, line 12, "j-the lens" should read -j-th lens--, and i-the lens" should read --i-th lens--.

At column 5, line 43, "j-the lens" should read --j-th lens--; and

At column 5, line 45, "i-the lens" should read --i-th lens--.

UNITED STATES PATENT AND TRADEMARK OFFICE
CERTIFICATE OF CORRECTION

PATENT NO. : 4,832,471

DATED : May 23, 1989

INVENTOR(S) : HIROYUKI HAMANO

It is certified that error appears in the above-identified patent and that said Letters Patent is hereby corrected as shown below:

At column 10, line 4, "j-the lens" should read --j-th lens--;

At column 10, line 5, "i-the lens" should read --i-th lens--;

At column 10, line 7, "j-the lens" should read --j-th lens--, and "i-the lens" should read --i-th lens--;

At column 10, line 8, "i-the lens" should read --i-th lens;

At column 10, line 22, "$1.85<(R1,5+R1,4)/(R1,5-R1,4)2.05$" should read --$1.85<(R1,5+R1,4)/(R1,5-R1,4)<2.05$--; and At column 10, line 56, "j-the lens" should read --j-th lens;

At column 10, line 57, "i-the lens" should read --i-th lens; and

At column 10, line 59, "i-the lens" should read --i-th lens.

Signed and Sealed this

Twenty-seventh Day of March, 1990

*Attest:*

JEFFREY M. SAMUELS

*Attesting Officer*     *Acting Commissioner of Patents and Trademarks*